US011473008B2

(12) United States Patent
Varela et al.

(10) Patent No.: US 11,473,008 B2
(45) Date of Patent: Oct. 18, 2022

(54) FRACTURING FLUID COMPOSITION AND METHOD FOR IN SITU GENERATION OF GEOMIMETIC CRYSTAL NETWORK PROPPANTS

(71) Applicant: YPF TECNOLOGÍA S.A., Ciudad Autonoma de Buenos Aires (AR)

(72) Inventors: Augusto Nicolás Varela, City Bell (AR); Remigio Ruiz, Ciudad Autonoma de Buenos Aires (AR); Paula Cecilia Dos Santos Claro, Villa Elisa (AR)

(73) Assignee: YPF TECNOLOGIA S.A., Ciudad Autonoma de Buenos Aires (AR)

( * ) Notice: Subject to any disclaimer, the term of this patent is extended or adjusted under 35 U.S.C. 154(b) by 0 days.

(21) Appl. No.: 17/190,307

(22) Filed: Mar. 2, 2021

(65) Prior Publication Data

US 2021/0277301 A1   Sep. 9, 2021

Related U.S. Application Data

(60) Provisional application No. 62/985,503, filed on Mar. 5, 2020.

(51) Int. Cl.
| | |
|---|---|
| *C09K 8/70* | (2006.01) |
| *E21B 43/26* | (2006.01) |
| *C09K 8/68* | (2006.01) |
| *C09K 8/66* | (2006.01) |
| *E21B 43/267* | (2006.01) |

(52) U.S. Cl.
CPC .............. *C09K 8/703* (2013.01); *C09K 8/665* (2013.01); *C09K 8/68* (2013.01); *E21B 43/26* (2013.01)

(58) Field of Classification Search
CPC ........ E21B 43/267; E21B 43/26; E21B 43/16; C09K 8/80; C09K 8/805; C09K 8/70; C09K 8/68; C09K 8/536; C09K 2208/32; C09K 8/62
See application file for complete search history.

(56) References Cited

U.S. PATENT DOCUMENTS

| | | | | |
|---|---|---|---|---|
| 3,310,112 A | * | 3/1967 | Nielsen | .................... E21B 43/26 166/280.1 |
| 2005/0059555 A1 | * | 3/2005 | Dusterhoft | ............... C09K 8/68 507/100 |
| 2011/0259761 A1 | * | 10/2011 | McGuire | ................... C02F 5/02 204/232 |
| 2016/0009980 A1 | * | 1/2016 | Gupta | .................... E21B 37/06 507/202 |

* cited by examiner

*Primary Examiner* — Zakiya W Bates
(74) *Attorney, Agent, or Firm* — Muncy, Geissler, Olds & Lowe, P.C.

(57) ABSTRACT

A composition for fracking an unconventional reservoir including hard water and liquid carbon dioxide for in-situ generation of proppant particles. A method for fracturing a rock formation in an unconventional reservoir at high temperature and pressure conditions, including pumping the composition into the rock formation and precipitating calcite and aragonite crystals inside the rock formation.

9 Claims, 4 Drawing Sheets

FRACTURING FLUID COMPOSITION AND METHOD FOR IN SITU GENERATION OF GEOMIMETIC CRYSTAL NETWORK PROPPANTS

CROSS REFERENCE TO RELATED APPLICATIONS

This application claims priority of U.S. Provisional Application No. 62/985,503 filed on Mar. 5, 2020 under 35 U.S.C. § 119(e), the entire contents of all of which are hereby incorporated by reference.

TECHNICAL FIELD

The present invention relates to the field of methods and compositions suitable for hydraulic fracture propping in shale reservoirs. In particular, the present invention relates to a composition and a method for generation of geomimetic crystal network proppant particles within a rock formation.

BACKGROUND

The development of unconventional oil and gas reservoirs has been largely carried out by fracking technology developed for conventional reservoirs. Techniques for hydraulic stimulation using sand as proppant particles have been widely applied to shale reservoirs.

Sand proppant particles have been conceived for a conventional reservoir. Natural and industrial sand proppants have been widely used also in unconventional reservoirs, generating several operational and technical challenges, such as a low ratio of stimulated volume to propped up volume, sand proppant embedded in the fracture walls (i.e. embedment), proppant flowback, supply and logistics problems, etc.

Several unconventional reservoirs around the world have natural fractures filled with diagenetic $CaCO_3$ (mainly calcite and aragonite) with a characteristic "dog tooth" texture, which confers high fracture conductivity, as well as mechanical resistance and no proppant flowback. The reservoirs associated to natural fracture systems filled with these carbonates have a high production rate due to the good secondary porosity and permeability (i.e. high fracture conductivity).

Geomimetics is a technique based on the imitation of natural geological processes. In this case, geomimetic has been applied to generate in situ crystal network proppants during hydraulic fracturing of shale reservoirs from the fluid fracture. This is a geological solution for a geological problem, taking nature as a source of inspiration.

Therefore, there is a need to provide compositions and methods based on geomimetics, that allow keeping open a larger volume of fractures, as well as increasing hydraulic fracture conductivity, thereby enhancing well production. In addition, there is a need for a fracturing fluid composition that can act as a triple agent: a fracture agent, a carrier agent and a proppant agent.

SUMMARY

In order to advantageously overcome the drawbacks of the prior art, a geological solution is provided based on geomimetics.

As a first object, the present invention provides a composition for fracking an unconventional reservoir, wherein the composition comprises hard water and liquid carbon dioxide.

In an embodiment, the composition further comprises a carboxamide. Preferably, the carboxamide is selected from urea, formamide, acetamide, benzamide and N,N-dimethylformamide. More preferably, the carboxamide is urea.

In preferred embodiments, the ratio of hard water to carbon dioxide is of 7:3 to 9.5:0.5 in volume. Preferably, the ratio of hard water to carbon dioxide is of about 8:2 in volume.

In a particularly preferred embodiment, the composition comprises hard water, liquid carbon dioxide with a ratio of hard water to carbon dioxide is of 7:3 to 9.5:0.5 in volume, and a carboxamide selected from urea, formamide, acetamide, benzamide and N,N-dimethylformamide at a concentration of about 30 g/L to 80 g/L in the composition.

As a second object, the invention provides a method for fracturing a rock formation in an unconventional reservoir, wherein the method comprises pumping a composition provided by the invention into the rock formation.

In preferred embodiments, the composition is pumped at a temperature between 20 and 120° C. More preferably, the composition is pumped at a temperature between 80 and 120° C. Even More preferably, the composition is pumped at a temperature of 110° C.

In other embodiments, the composition is pumped at a pressure between 300 and 750 bar.

DETAILED DESCRIPTION

Figure 1:
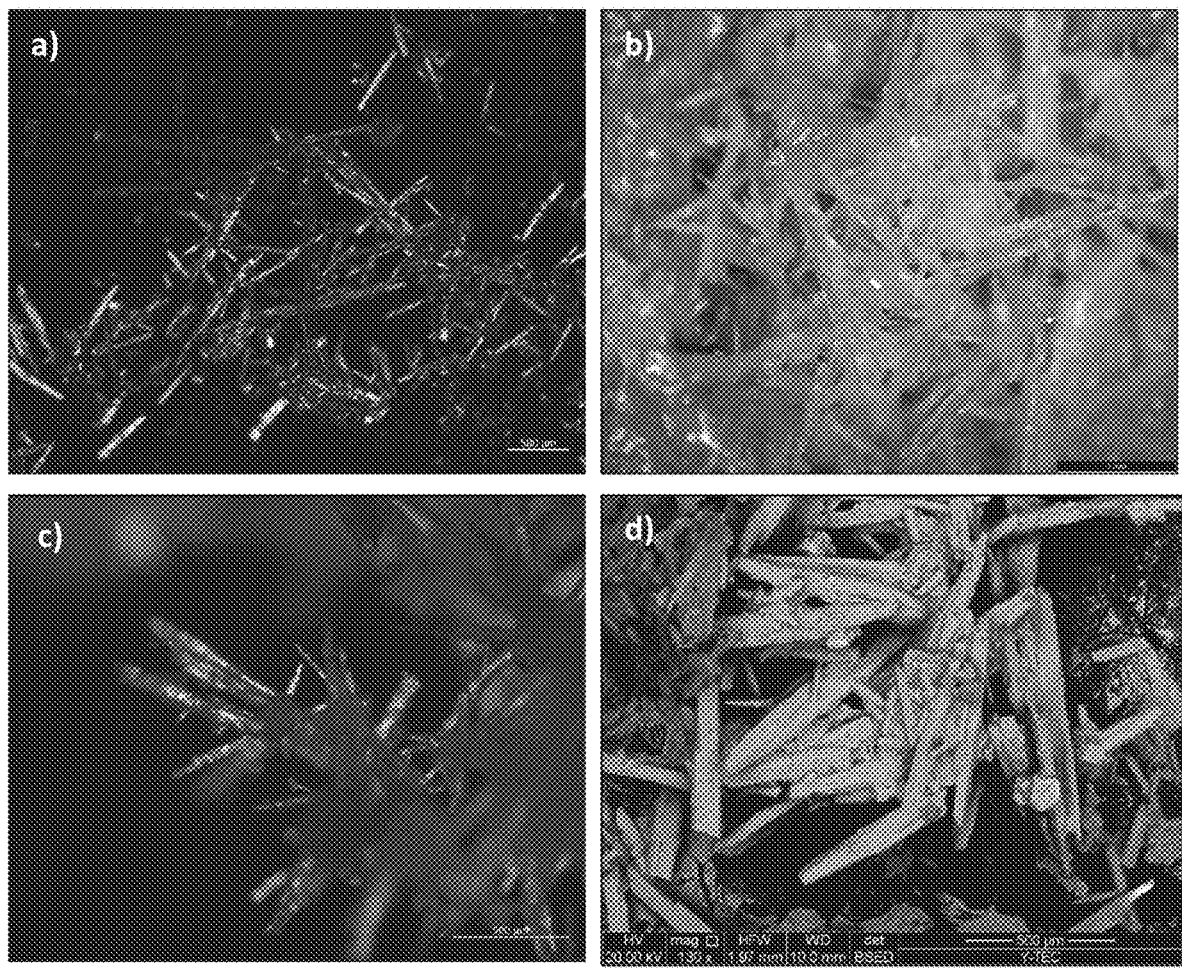
FIG. 1 shows acicular calcite and aragonite crystals network obtained at high temperatures and low pressures using the method provided by the invention.

The invention will be described in further detailed below, with reference to the accompanying figures and non-limiting examples of preferred embodiments.

The method provided by the invention involves the hydraulic fracturing or fracking using a mixture of hard water, a carboxamide and liquid carbon dioxide ($CO_2$), with a composition of about 70-90% hard water and 10-30% $CO_2$ by volume (% v/v). Liquid carbon dioxide is commercially available and might be obtained from highly compressed and cooled gaseous carbon dioxide using methods well known in the art.

As used herein, the term "hard water" refers to water comprising divalent cations, such as $Ca^{2+}$ $Mg^{2+}$, $Ba^{2+}$ and $Sr^{2+}$ and monovalent cations such as $Na^+$, $K^+$ and $Li^+$, as well as anions such as $Cl^-$, $SO_4^{2-}$, $CO_3H^-$, $CO_3^{-2}$ and $NO_3^-$.

The term "carboxamide" as used herein refers to chemical compounds of general formula RC(=O)NR'R", where R, R', and R" represent organic groups, amines or hydrogen atoms. Non-limiting examples of carboxamides as used herein are the compounds of formulas $CO(NH_2)_2$, $H_3C-CONH_2$, $C_6H_5-CONH_2$ and $HCON(-CH_3)_2$. The carboxamide compound acts as pH buffer when present in the fracture fluid composition at a concentration of about 10 to about 100 g/L, more preferably from about 30 to about 80 g/L.

The fracture fluid provided by the invention is pumped into the reservoirs at well conditions, i.e. temperatures between 80 and 110° C. and pressure ranges between 300 and 750 bar. At these conditions, $CO_2$ is past its critical point and behaves as a supercritical fluid.

Once the pumping is stopped, a slight pressure drop is produced, and the equilibrium of the following reaction is shifted to the right:

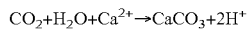

Surprisingly, it was found that the obtained aragonite and calcite crystal network particles act as proppant agents, due to their tridimensional characteristic crystalline structure. The fluid generating the fracture also keeps the fracture open, as occurs in nature at the same pressure and temperature conditions.

Since the fluid fracture is being pumped into the reservoir, the carbonate crystal network is generated in situ, propping up the hydraulic fracture that is produced, i.e. the fluid fracture acts as a triple agent: a fracture agent, a carrier agent and proppant agent, advantageously both increasing the propped volume and enhancing fracture conductivity of the reservoir, which results in higher reservoir productivity.

The composition of the invention is particularly suited for unconventional reservoirs, such as shale-gas and shale-oil reservoirs.

The advantageous features of the inventions further include:
  Economic: lower operating costs, less supplies required in operating procedures and higher oil and gas production.
  Technical operating procedures: greater propped volume in relation to stimulated volume, no use of sand proppants, less logistics supply, the fracture fluid performs as a triple agent (i.e. fracture, carrier and proppant agent).
  Reservoir production: improve hydraulic fracture conductivity (i.e. porosity and permeability conditions in the hydraulic fracture).
  Environmentally friendly: $CO_2$ sequestration by carbonate crystal network precipitation reduces the carbon footprint with less supply transport and logistics (sand proppant, carrier, etc).

EXAMPLES

Example 1 (High Temperatures, Low Pressures)

Several synthesis reactions were carried out using the different fluid compositions shown in Table 1. Laboratory experiments were performed at temperatures of 60, 80, 100 and 110° C. In all cases, $CO_2$ gas was bubbled reaching pressures up to 150 psi. The reaction proceeded between 60 and 120 min.

Figure 2:
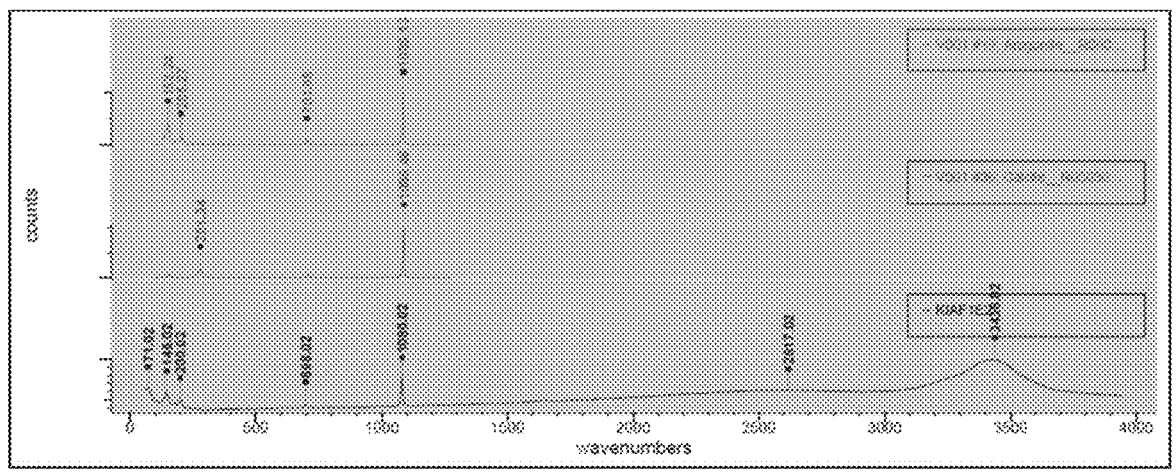
FIG. 2 shows the RAMAN spectrum of the crystals synthesized in the method provided by the invention (bottom) and reference spectrums of aragonite (top) and calcite (middle) according to an embodiment at high temperatures and low pressures.

Calcite and aragonite crystals were obtained, as can be seen in FIGS. 1 and 2. FIG. 1 shows the crystals as obtained by: a) petrographic cross-light; b) binocular microscope; c) petrographic parallel-light; d) scanning electron microscopy (SEM).

The crystals show acicular and prismatic crystalline morphologies, creating a tridimensional crystal network. The crystals reached a size between 500 μm and 1.5 mm, as shown in FIG. 1 and FIG. 2.

TABLE 1

| Reagents | Concentration (g/l) | | | | | | | |
| --- | --- | --- | --- | --- | --- | --- | --- | --- |
| | Solution 1 | Solution 2 | Solution 3 | Solution 4 | Solution 5 | Solution 6 | Solution 7 | Solution 8 |
| CaCl2•2H2O | 44 | 44 | 44 | 44 | 44 | 44 | 22 | 22 |
| Ca(OH)2 | 22 | 22 | 22 | 22 | 0 | 0 | 0 | 0 |
| MgCl2•6H2O | 18 | 18 | 152 | 152 | 18 | 18 | 18 | 18 |
| Na2SO4 | 1 | 1 | 1 | 1 | 1 | 1 | 15 | 15 |
| NaHCO3 | 1 | 1 | 1 | 1 | 1 | 1 | 3 | 3 |
| KCl | 0 | 0 | 0 | 0 | 10 | 10 | 20 | 20 |
| NaCl | 50 | 50 | 50 | 50 | 50 | 50 | 40 | 40 |
| CO(NH2)2 | 36 | 72 | 36 | 72 | 36 | 72 | 32 | 72 |

Example 2 (Reservoir Conditions: High Temperatures and High Pressures)

Further synthesis reactions were carried out with the fluid compositions of Table 1. Reactions were carried out at 110° C., using liquid $CO_2$ in relative proportions to the hard water solution (5 to 30% $CO_2$ and 70 to 95% of hard water solution); and pressures of 300, 500, 600 and 750 bar. These reactions were carried out for 4, 6, 12 and 24 h, corresponding to the time employed on the field fracking operation.

Figure 3:
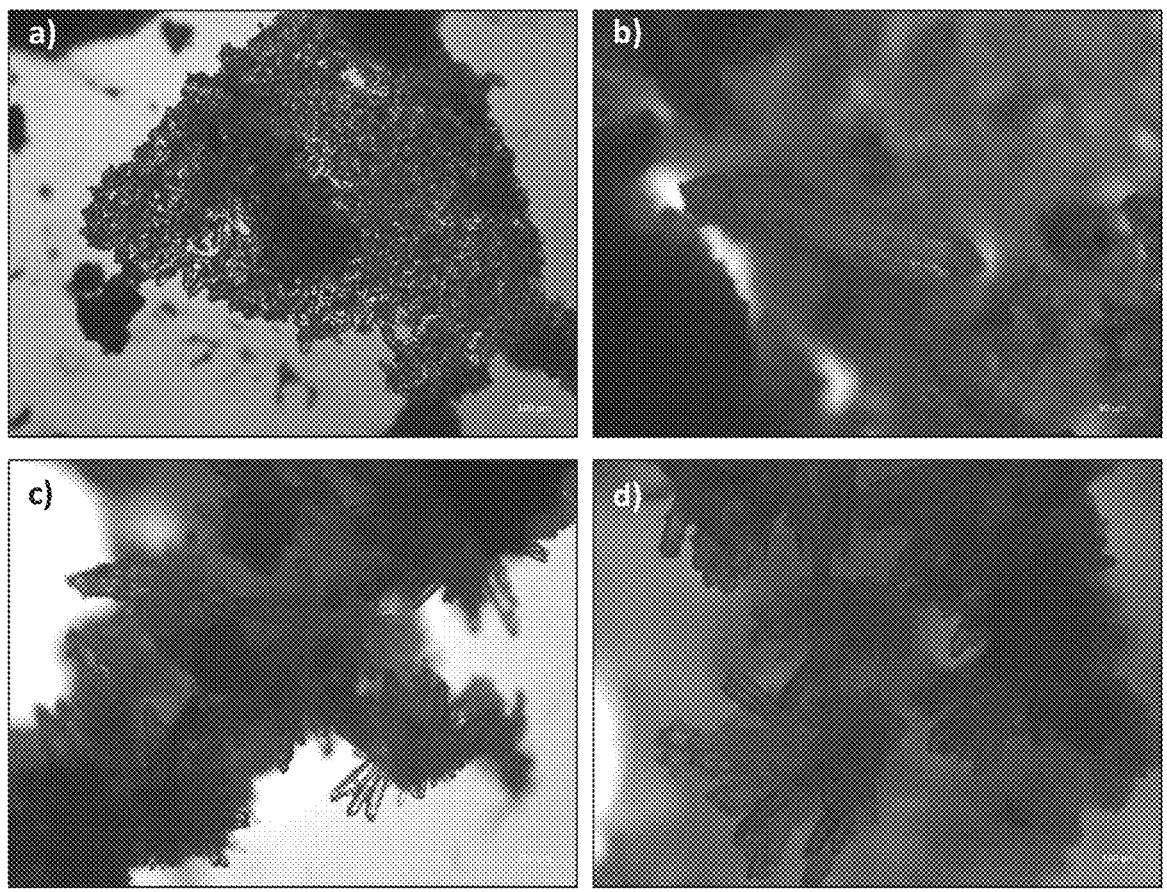
FIG. 3 shows acicular calcite and aragonite crystals networks obtained at reservoir conditions (high temperatures and pressures) using the method provided by the invention.
Figure 4:
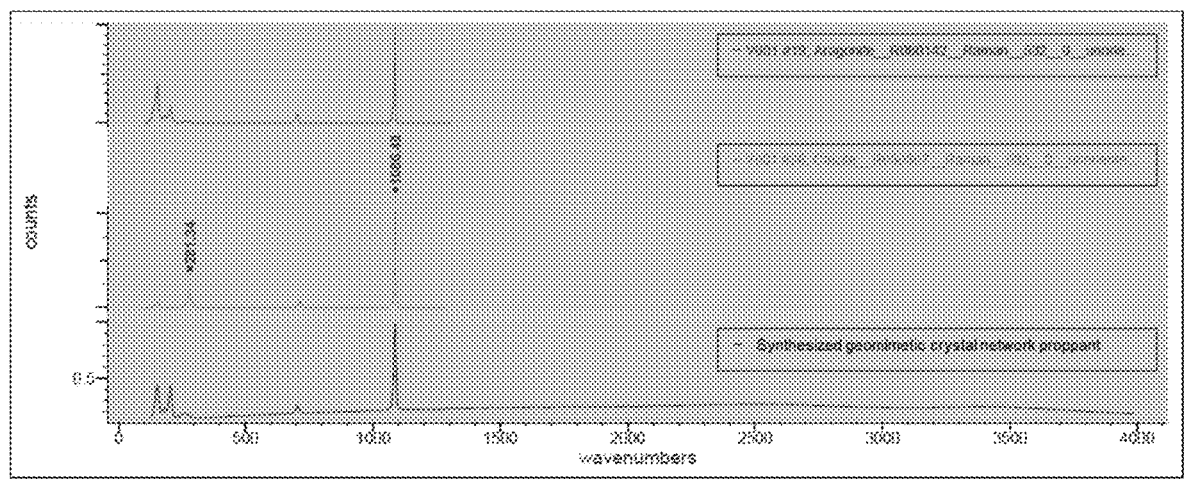
FIG. 4 shows the RAMAN spectrum of the synthesized crystals in the method provided by the invention (bottom) and reference spectrums of aragonite (top) and calcite (middle) according to an embodiment at high temperatures and high pressures.

Crystal networks of aragonite and calcite were obtained. The present acicular and prismatic crystalline structures create a tridimensional crystal network. The crystals size reached up to 500 μm, as shown in FIG. 3 and FIG. 4.

Example 3 (Shale-Rock at High Temperatures and Low Pressures)

Figure 5:
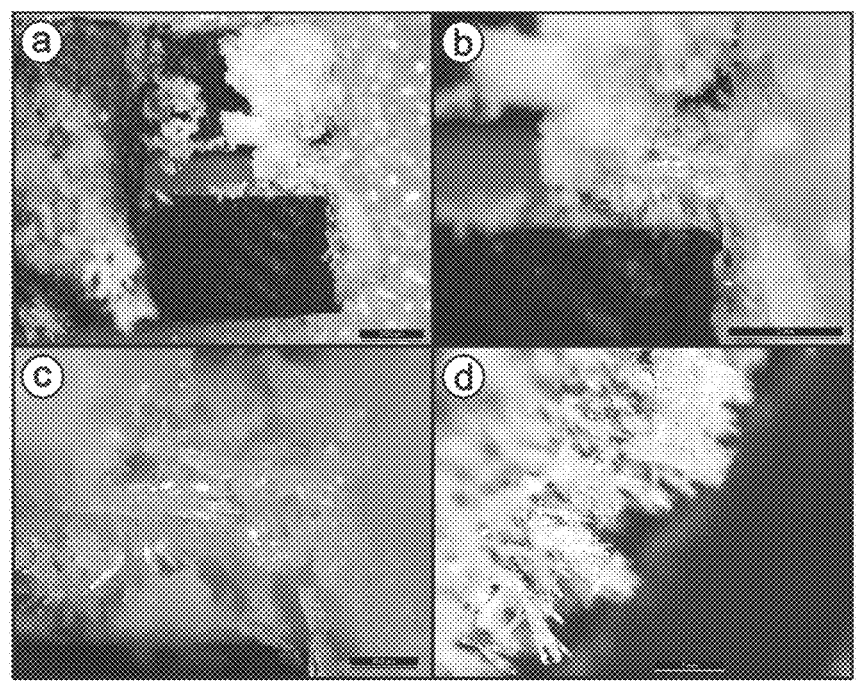
FIG. 5 shows acicular aragonite crystals networks obtained at high temperatures and low pressures using the method provided by the invention, filling and propping shale-rock fractures.

Several synthesis reactions were carried out using the different fluid compositions of Table 1. Laboratory experiments were performed at 110° C. In all cases, $CO_2$ gas was bubbled reaching pressures up to 150 psi. The reaction proceeded for 2, 4, 6, 12 and 24 h. Calcite and aragonite crystals were obtained, as seen in FIG. 5. The crystal network shows acicular crystalline morphologies, creating a tridimensional crystal network. The crystals reached a size between 500 μm and 1.5 mm, as shown in FIG. 5.

In FIG. 5, a) and d) are microscope views of in-situ geomimetic crystal network proppants generated in a shale-rock fracture. b) to c) are a detailed view of the crystal network growing from both sides of fracture, and d) shows a detailed view showing the effective connection between shale-rock reservoir and the interior of the fracture.

Example 4 (Shale-Rock Under Reservoirs Conditions: High Temperatures and High Pressures)

Further synthesis reactions were carried out with the different fluid compositions of Table 1 for in situ generation of geomimetic crystal network proppants in shale-rock samples. Reactions were carried out at 60, 80, 100 and 110° C., using liquid $CO_2$ in relative proportions to water solution (5 to 30% $CO_2$ and 70 to 95% of hard water solution); and pressures of 300, 500, 600 and 750 bar. These reactions were carried out for 4, 6, 12 and 24 h, corresponding to the times employed on the field fracking operation.

Crystal networks of aragonite and calcite were obtained. The present robust prismatic crystalline structures create a tridimensional crystal network. The crystals size reached up to more than 1 mm, as seen in FIG. 6.

Figure 6:
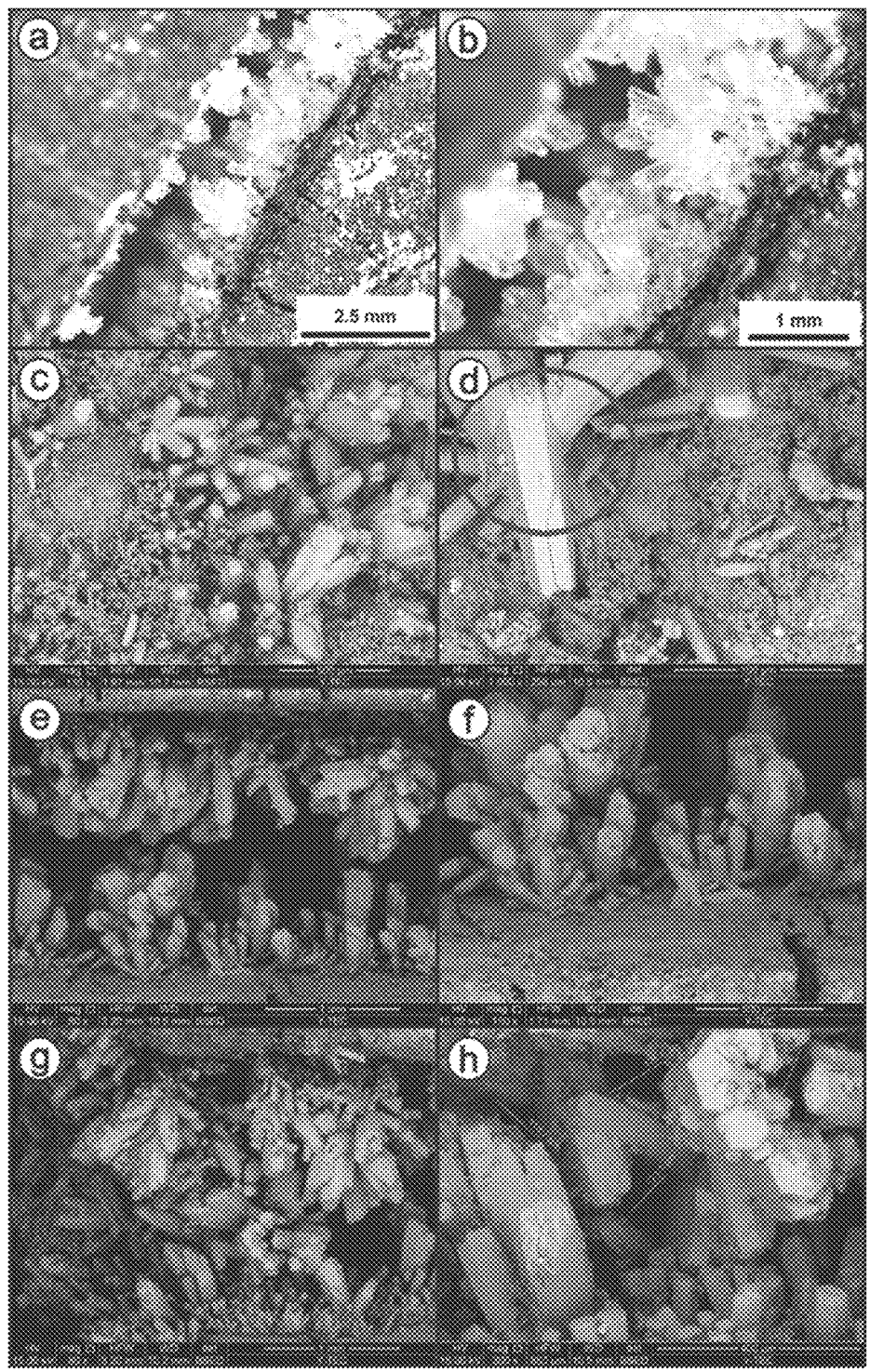
FIG. 6 shows prismatic aragonite crystals network obtained at reservoirs condition (high temperatures and high pressures) using the method provided by the invention, filling and propping shale-rock fractures.

In FIG. 6, a) and b) show a microscope view of in-situ geomimetic crystal network proppants generated in a shale-rock fracture, c) to h) show detailed SEM photographs, c) is a general view of fractal crystal network behavior, d) shows a detailed prismatic aragonite crystal habit, e) shows the crystal network growing from both sides of fracture, f) is a detailed view showing the effective connection between shale-rock reservoir and the interior of the fracture, g) is a detailed view of a prismatic crystal network intergrowing from both sides of the fracture, and h) is a detailed view of the interconnected poral network.

The invention claimed is:

1. A composition for fracking an unconventional reservoir, wherein the composition comprises a mixture of hard water comprising divalent cations and liquid carbon dioxide, wherein a ratio of the hard water to the liquid carbon dioxide is 7:3 to 9.5:0.5 in volume.

2. The composition according to claim 1, wherein the composition further comprises a carboxamide.

3. The composition according to claim 2, wherein the carboxamide is urea, formamide, acetamide, benzamide, or N,N-dimethylformamide.

4. The composition according to claim 3, wherein the carboxamide is urea.

5. The composition according to claim 2, wherein the carboxamide is at a concentration of about 30 g/L to 80 g/L in the composition.

6. A method for fracturing a rock formation in an unconventional reservoir, wherein the method comprises pumping the composition according to claim 1 into the rock formation, letting the composition react, and precipitating calcite and aragonite crystals inside the rock formation.

7. The method according to claim 6, wherein the composition is pumped at a temperature between 80 and 120° C.

8. The method according to claim 7, wherein the composition is pumped at a temperature of 110° C.

9. The method according to claim 8, wherein the composition is pumped at a pressure between 300 and 750 bar.

* * * * *